United States Patent [19]

Spengler

[11] Patent Number: 4,519,766
[45] Date of Patent: May 28, 1985

[54] APPARATUS FOR MANUFACTURING THREE-DIMENSIONAL WORK PIECES

[75] Inventor: Ernst M. Spengler, Heusenstamm, Fed. Rep. of Germany

[73] Assignee: Stanztechnik GmbH R+S, Frankfurt, Fed. Rep. of Germany

[21] Appl. No.: 485,739

[22] Filed: Apr. 18, 1983

Related U.S. Application Data

[63] Continuation-in-part of Ser. No. 260,418, May 4, 1981, Pat. No. 4,405,537, which is a continuation-in-part of Ser. No. 965,745, Dec. 4, 1978, Pat. No. 4,273,738.

[51] Int. Cl.³ .............................................. B29C 17/04
[52] U.S. Cl. .................................. 425/302.1; 425/413; 425/415; 425/416; 425/452
[58] Field of Search .................... 425/302.1, 415, 413, 425/416, 452

[56] References Cited

U.S. PATENT DOCUMENTS

| | | | |
|---|---|---|---|
| 2,586,210 | 2/1952 | Corwin | 425/452 |
| 2,990,069 | 6/1961 | Repasky | 425/452 |
| 3,640,666 | 2/1972 | Jope | 425/302.1 |
| 4,029,457 | 6/1977 | Yamamoto | 425/416 |
| 4,289,469 | 9/1981 | Keim | 425/302.1 |
| 4,308,005 | 12/1981 | Zundel | 425/302.1 |

Primary Examiner—John A. Parrish
Attorney, Agent, or Firm—W. G. Fasse; D. H. Kane, Jr.

[57] ABSTRACT

A three-dimensional work piece, such as an interior part for a car, is manufactured by keeping the blank, such as a sheet of plastic on or in the same primary mold (24) for the initial shaping step, for the foaming step, for the curing step and for the final trimming step. The primary mold (24) shuttles back and forth in a given direction for sequential cooperation with two secondary molds (75 and 31 or 48 and 31) arranged for reciprocation in a direction extending perpendicularly to said given direction. Preferably, two primary mold members (66, 67) are arranged for horizontal back and forth shuttling in unison so that each primary mold member may cooperate with two out of three vertically reciprocable secondary molds. The efficiency is substantially doubled when each of two primary mold members (66, 67) cooperates with two out of three secondary molds. Three stations (1, 3, 10) are located next to one another so that the two primary mold members, which are rigidly connected to each other, may shuttle back and forth between two adjacent stations (1 and 3 or 1 and 10).

20 Claims, 11 Drawing Figures

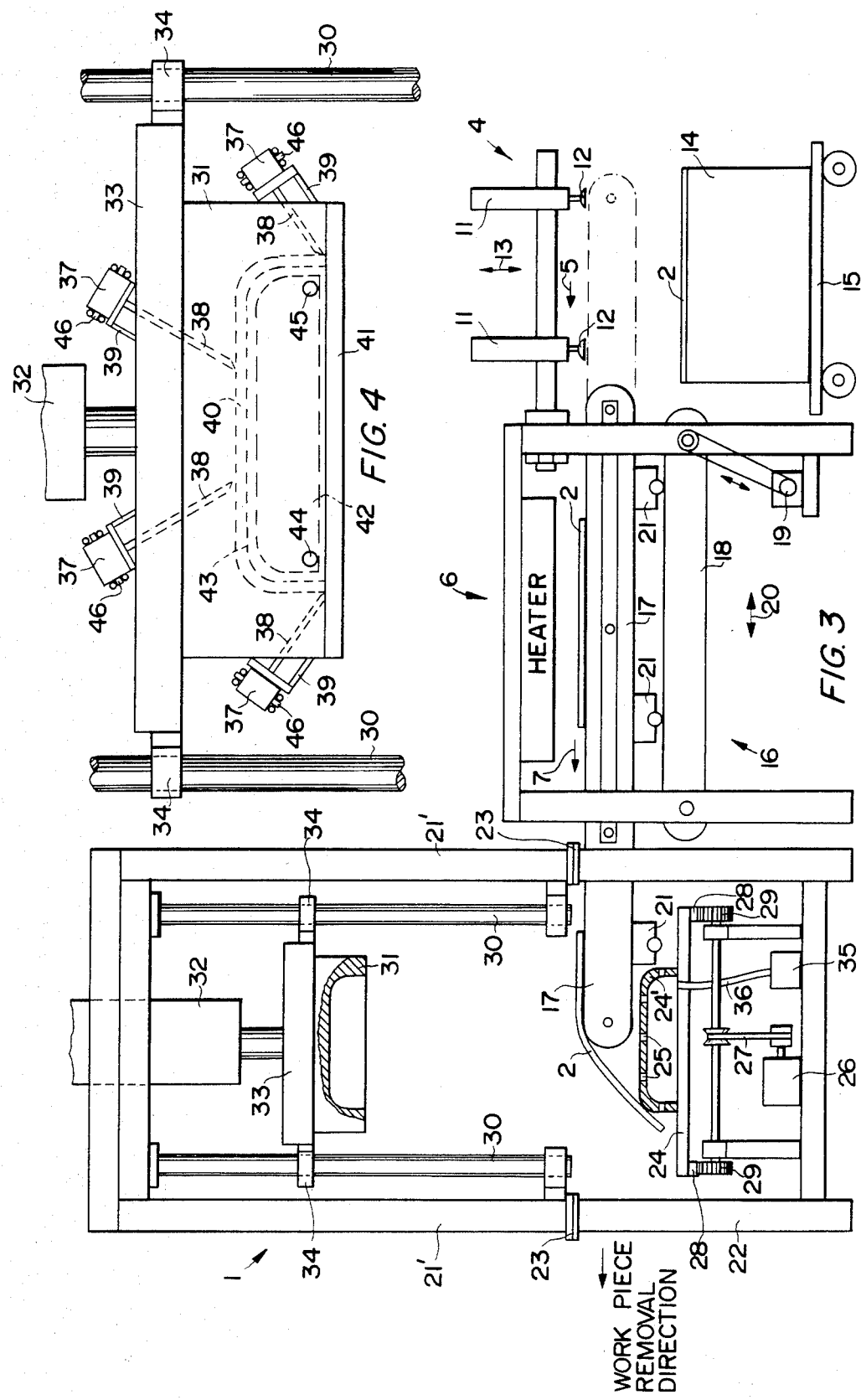

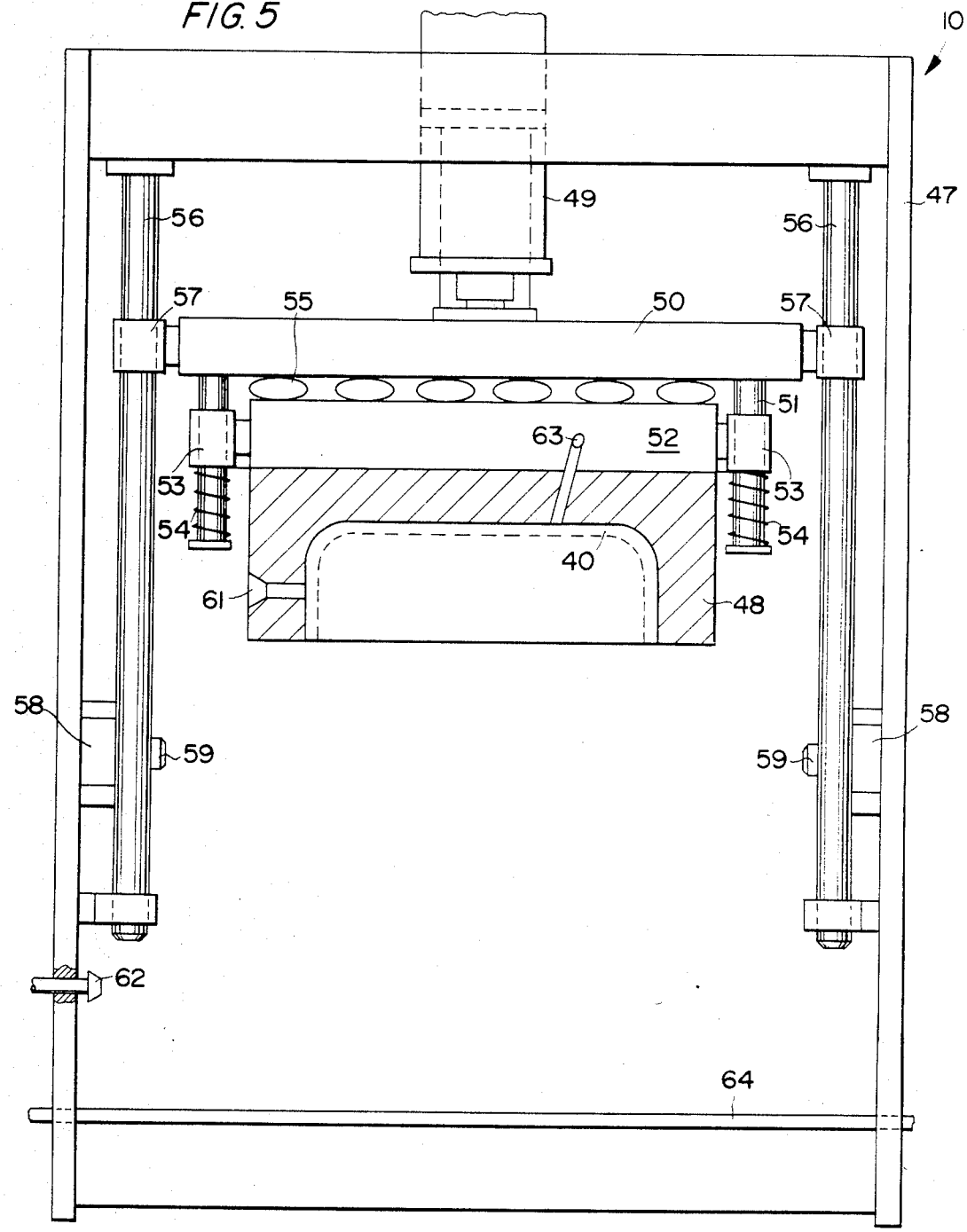

APPARATUS FOR MANUFACTURING THREE-DIMENSIONAL WORK PIECES

CROSS-REFERENCE TO RELATED APPLICATION

The present application is a continuation-in-part application of my copending U.S. Ser. No. 260,418, filed on May 4, 1981, now U.S. Pat. No. 4,405,537 issued on Sept. 20, 1983, which is a continuation-in-part application of my then copending Ser. No. 965,745, filed on Dec. 4, 1978, now U.S. Pat. No. 4,273,738; issued on June 16, 1981, for a Method and Apparatus for Forming and Trimming Three-Dimensional Work Pieces. The present application is directed to the apparatus portion of U.S. Ser. No. 260,418, now U.S. Pat. No. 4,405,537.

BACKGROUND OF THE INVENTION

The present invention relates to an apparatus for manufacturing three-dimensional work pieces. Flat work pieces in this context are not considered to be three-dimensional work pieces, even if they have a substantial thickness. An interior car part is a typical example of a three-dimensional work piece manufactured according to the invention.

In U.S. Pat. No. 4,273,738, a lower mold cooperates with an upper mold for shaping an initially flat sheet of plastic material. At least one mold or support carries trimming tools which are moved through the respective mold in order to trim the work piece while it is still in the same mold. My prior U.S. Pat. No. 4,273,738 does not teach the cooperation of one or two primary molds with several secondary molds in sequence.

My U.S. Pat. No. 4,106,379, which issued on Aug. 15, 1978, for an apparatus for trimming three-dimensional work pieces discloses a lower support which cooperates with trimming tools and which may shuttle back and forth between a loading station and the trimming station.

U.S. Pat. No. 4,063,477 discloses an apparatus and method for cutting carpet. A stationary lower support and a vertically movable upper support hold a preshaped carpet in position for the cutting operation. Vertically movable first cutting means travel through the lower and upper support which hold the carpet during the cutting. Second cutting means are positioned for cutting in directions extending at an angle to the vertical or horizontal direction. The apparatus of U.S. Pat. No. 4,063,477 is also not suitable for the sequential shaping, foaming, and trimming of the same work piece while the work piece is retained on the same primary mold during all manufacturing steps.

U.S. Pat. No. 3,273,203 discloses an apparatus for transferring plastic sheet material from one station to another station in a system of cooperating machines.

The prior art machines are not suitable for first forming a plastic sheet into a desired three-dimensional shape and then foaming and trimming the sheet or rather the three-dimensional shape.

OBJECTS OF THE INVENTION

In view of the foregoing, it is the aim of the invention to achieve the following objects singly or in combination:

to simplify the production of three-dimensional work pieces, such as dashboards, door panels, and the like, by performing a plurality of work steps in several stations of a single machine, rather than in several separate machines;

to use a single primary mold, which may be of the male or female type, in such a way that it cooperates with a plurality of secondary or complementary female or male molds in a sequential operation of the apparatus;

to reciprocate or shuttle a plurality of molds relative to each other so that several manufacturing steps including shaping, foaming, curing, and trimming may be performed in a single manufacturing system without removing the work piece from the primary mold;

to assure the dimensional stability and shape accuracy of the work piece by retaining the work piece on the same primary mold during all operational steps of the apparatus;

to flow a coolant, such as water, through a mold under such pressure that the coolant performs a cooling function and that it increases the dimensional stability of the mold configuration whereby the molds may be of a relatively light construction;

to lock the movable mold means rigidly to a machine frame when the mold means are pressurized so that the forces are directly introduced into the machine frame to relieve the mold support and mold moving or drive means; and to tilt at least a portion of a mold means between a molding position and a mold treatment position.

SUMMARY OF THE INVENTION

The present apparatus transforms a flat blank of plastics material into a three-dimensional work piece by first placing the flat blank, such as a sheet of ABS resin or of other suitable thermo-plastic polymers, such as polypropylene, into or onto a primary mold which may be of the female kind having a cavity or of the male kind having a respective projection or projections. The blank is then shaped while it contacts the primary mold and assumes the form of the primary mold, for example by the application of a vacuum through holes in the primary mold. The shaping may also be accomplished by pressing together two mold components such as the primary mold and a secondary mold. The mold blank is then brought into contact with a foaming material, e.g., a two components polyurethane foam material. The foaming is performed while one side of the molded blank is still in full contact with the primary mold. The primary mold is preferably closed by means of a first secondary mold so as to assure the curing of the foamed material in a confined space, preferably under pressure, whereby the foamed material is bonded to the plastics material of the molded blank to form the three-dimensional work piece. The primary mold still carrying the three-dimensional work piece is then separated from the first secondary mold and moved with the work piece held in the primary mold means into cooperation with holding means for holding the work piece in the primary mold means during a trimming operation. The holding means may comprise second secondary mold means which operate as counter-holder for the trimming operation. Thus, the work piece remains in the same primary mold during all the recited operational steps of the apparatus. It follows from the foregoing that the primary mold must be compatible for sequential cooperation with a plurality of secondary mold means.

The foaming operation may be performed after first closing the primary mold with the first secondary mold to form a molding space into which the foaming material is introduced. First closing the mold cavity will be preferable where the primary, lower mold is a male type mold with projections rather than with a cavity into which the spraying of the two components foaming material could start even before closing the cavity.

The apparatus according to the invention comprises at least two, preferably three, operating stations. The primary mold means are movably supported in the first station. First drive means are operatively connected to the primary mold means to reciprocate the primary mold means in a given direction. The primary mold means cooperate with forming means, for example in the form of a vacuum effective through the primary mold means, or with a secondary mold means to form a molding cavity for the shaping of the flat blank. The second station supports a first secondary mold means also for movement into cooperation with the primary mold means whereby the first secondary mold means are driven by their respective second drive means in a direction substantially perpendicularly to the direction of movement of the primary mold means. The first station also supports work piece holding means such as first secondary mold means, or other work piece holding means which may operate as a counter-holder during a trimming operation. When the holding means comprise second secondary mold means they are driven by third drive means in a direction substantially perpendicularly to the movement of the primary mold means so that the second secondary mold means may also cooperate with the primary mold means. The second secondary mold means carry trimming tools which are driven by a separate fourth drive means and which are arranged so as to be able to move the trimming tool means relative to a three-dimensional plane defined by at least one of the mold means, for example, the second secondary mold means. During all of the just described operational steps of the apparatus, the work piece remains on or in the primary mold, whereby the dimensional stability and shape accuracy of the work piece is assured.

A further improvement is achieved by arranging the first station between two auxiliary stations including the above mentioned second station and a third station carrying third secondary mold means. The primary mold means comprise two mold members arranged in such a manner that one first mold member may cooperate with the first and second secondary mold means while the other first mold member may cooperate with the third and second secondary mold means, for example by shuttling the two first mold members horizontally back and forth and by reciprocating the first, second, and third secondary mold means vertically back and forth.

By keeping the work piece in or on the primary mold during all manufacturing steps, the invention achieves the important advantage that the work piece retains its dimensional stability, since shrinking due to cooling and misalignment due to repeated insertion of the same work piece into different mold means are avoided. Thus, very accurately shaped work pieces may be manufactured in the apparatus according to the invention. Moreover, the time loss and labor costs involved in the prior art for moving a partially finished work piece from one machine to another are avoided according to the invention which is a substantial economical advantage. Another important advantage of the invention is seen in that only one primary mold is needed rather than at least two or three primary molds in the prior art. The present molds may be made of glass fiber reinforced synthetic resin material.

BRIEF FIGURE DESCRIPTION

In order that the invention may be clearly understood, it will now be described, by way of example, with reference to the accompanying drawings, wherein:

FIG. 3 is a side view substantially toward the plane indicated by the arrows 3—3 in FIGS. 1 and 2;

FIG. 4 is an enlarged, more detailed side view of cooperating primary and secondary mold means also shown in FIG. 3;

FIG. 5 is a front view, partially in section, of the left station or machine unit in the direction of the arrow A in FIG. 2 showing secondary mold means in the raised position;

DETAILED DESCRIPTION OF PREFERRED EXAMPLE EMBODIMENTS AND OF THE BEST MODE OF THE INVENTION

Figure 1:
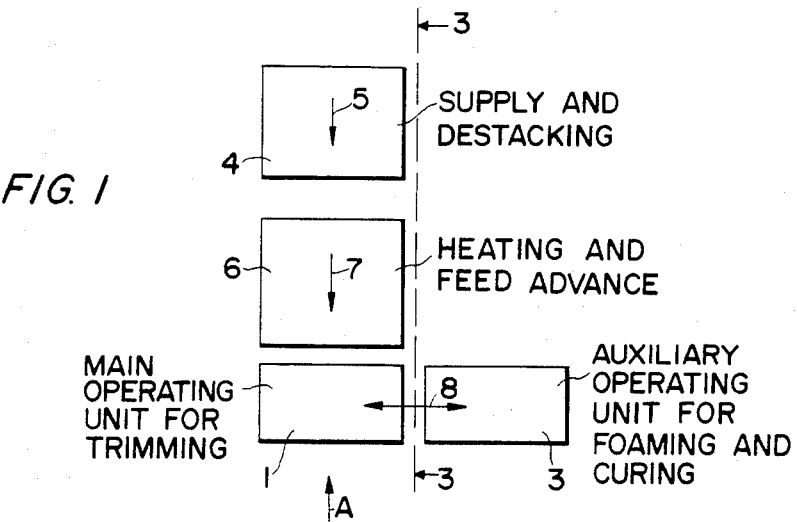
FIG. 1 is a block top plan view of a set of machine stations for explaining the coordination of these stations in the operation of the apparatus of the invention.

The machine system shown in FIG. 1 comprises a main operating unit 1 for the initial shaping of a flat blank 2 of sheet material shown in FIG. 3. The trimming of the shaped work piece is also performed in the unit 1. An auxiliary operating unit 3 for the foaming and curing is arranged directly adjacent to the unit 1. The flat blanks are fed by the supply and destacking unit 4 in the direction of the arrow 5 to a heating and feed advance unit 6, which feeds the blanks while they are being heated in the direction of the arrow 7 into the main operating unit 1. The components of the units 4 and 6 are conventional. Primary mold means shown in FIG. 3, for example, are arranged to shuttle horizontally back and forth between the units 1 and 3 as indicated by the arrow 8.

Figure 2:
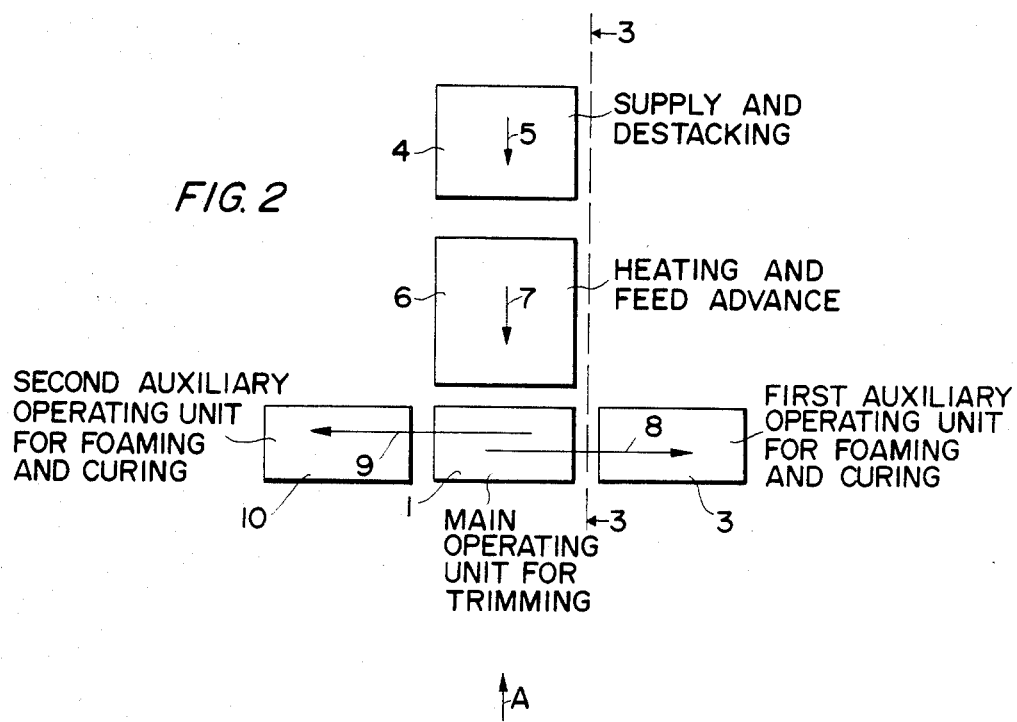
FIG. 2 is a view similar to that of FIG. 1 for explaining a modification of the present apparatus.
Figure 6:
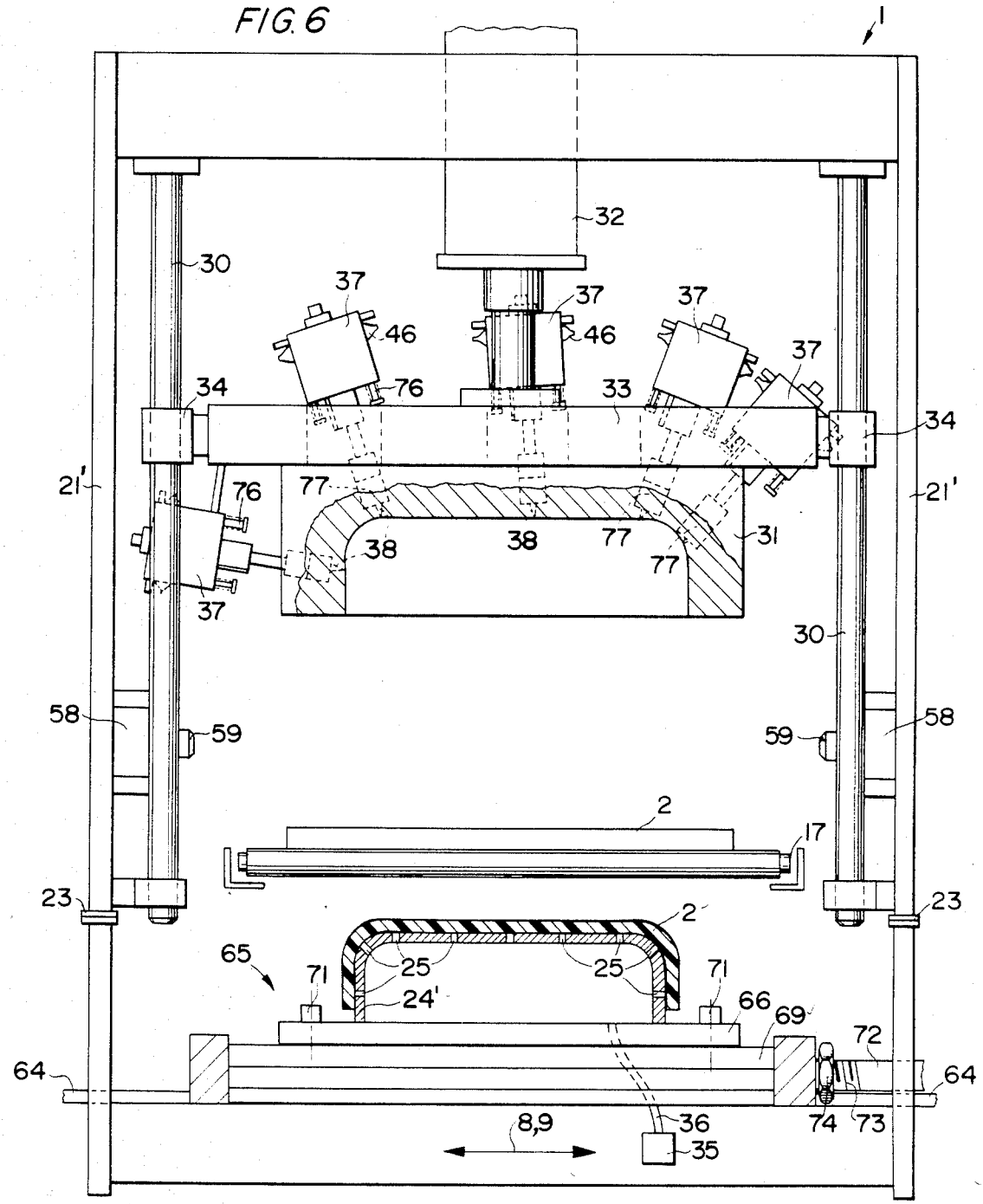
FIG. 6 is a front view, partially in section, of the central station or unit in the direction of the arrow A in FIG. 2 showing secondary mold means with the trimming tools in a partially raised position.
Figure 7:
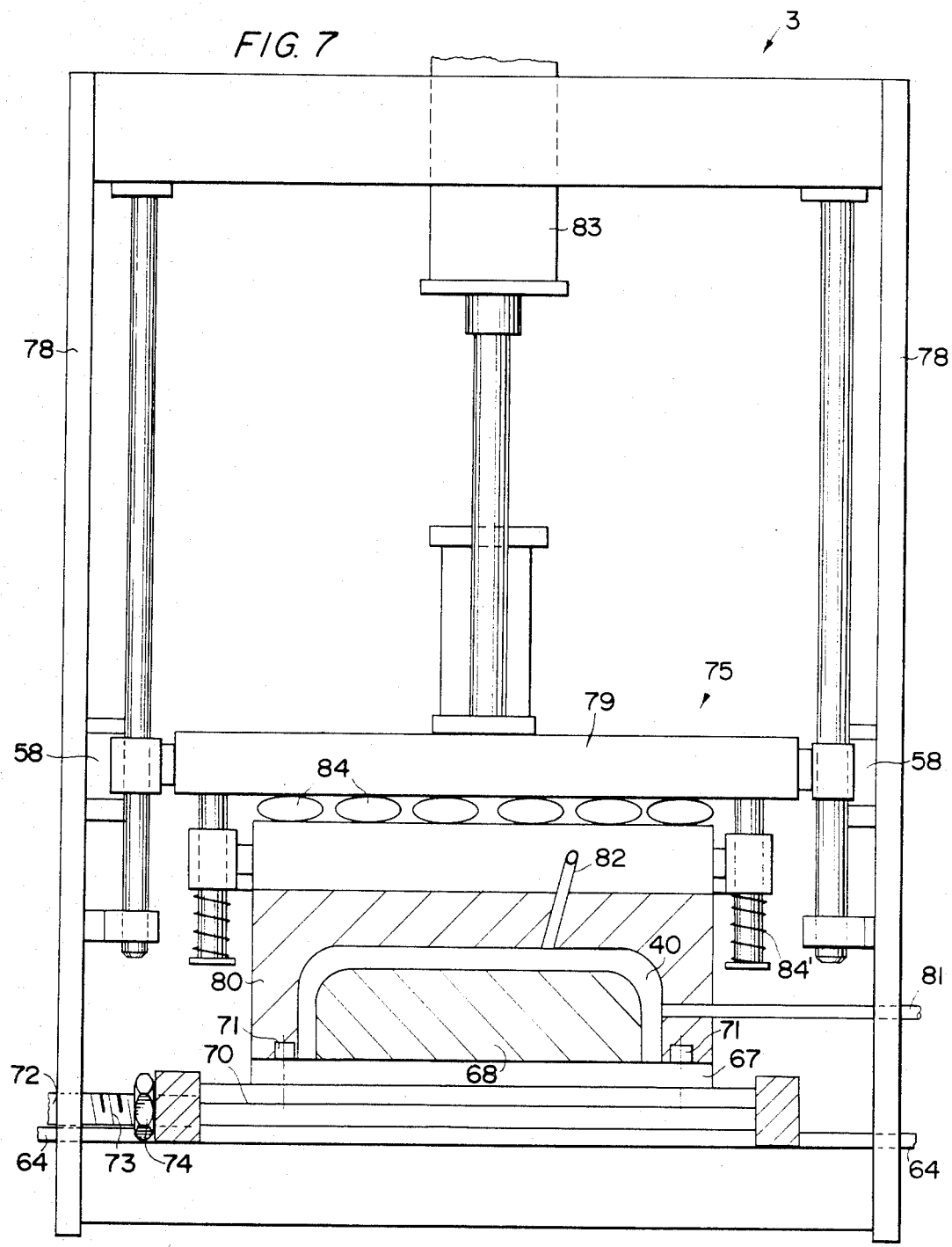
FIG. 7 is a front view, partially in section, of the right station or unit in the direction of the arrow A in FIG. 2 showing the primary and secondary mold means in the closed position.

The system of FIG. 1 is modified in FIG. 2 by a second auxiliary operating unit 10 for the foaming and curing of a work piece. The primary mold means comprise two members as shown in FIGS. 6 and 7, which shuttle horizontally back and forth for cooperation with unit 3, see arrow 8, and for cooperation with unit 10, see arrow 9. In the system of FIG. 2, the efficiency or output capacity of work pieces per unit of time is substantially doubled as compared to the system of FIG. 1. The output capacity in work pieces per hour depends on the curing time of the foam material which is conventionally about 2 to 4 minutes. For example, for a 4 minute curing time the system of FIG. 1 can produce 30 work pieces per hour, or twice as many as in a conventional single mold. The system of FIG. 2 improves the output capacity still further due to the use of three stations.

FIG. 3 is a view toward plane 3—3 in FIGS. 1 and 2. The sheet supply apparatus 4 comprises, for example, a plurality of piston cylinder members 11 which move suction cups 12 up and down, see arrow 13, for picking up flat sheets 2 from a stack 14 on a supply cart 15 which may comprise conventional means for lifting the stack, for example a hydraulic jack.

The heating and feed advance unit 6 of the invention comprises a double conveyor system 16 including an upper conveyor 17 and a lower conveyor 18. The lower conveyor 18 is driven by drive means 19 so that the upper run of the conveyor 18 moves alternately to the right and left as indicated by the double arrow 20. The upper conveyor 17 is, for example, a chain or roller conveyor, and it rotates always in the same direction, as indicated by the arrow 7. However, additionally, the entire conveyor 17 travels back and forth horizontally due to its cooperation with the lower conveyor 18. For this purpose the upper conveyor comprises at least three roller engagement members 21 which are so spaced that at all times at least two of these engagement members 21 are securely engaging the upper run of the lower conveyor 18. Thus, in the leftmost position of the upper conveyor 18, shown in FIG. 3, the central engagement member 21 and the right-hand engagement member 21 are engaging the upper run of the conveyor 18. When the upper conveyor 17 is in the right-hand position, shown in dashed lines in FIG. 3, the central and left-hand engagement members 21 will engage the upper run of the conveyor 18.

When the conveyor 17 is in the left position, as shown in FIG. 3, the suction cups 12 will be moved down to pick up the topmost blank 2 from the stack 14 and lift the blank to a level sufficiently above the upper run of the conveyor 17 so that the blank may be dropped onto the upper run of the conveyor 17 when the latter is in the dashed-dotted right position. When the conveyor 17 is in the right-hand position, it does not interfere with the operation of the mold means shown in the main operating unit 1.

The main operating unit 1 comprises an upper machine frame 21' and a machine base 22. The upper machine frame 21' is removably secured to the lower machine frame 22, as shown at 23, whereby the upper machine frame 21' may be exchanged with all the components carried by the upper machine frame as described in more detail in my above mentioned U.S. Pat. No. 4,273,738. The machine base 22 carries primary mold means 24 including a male mold body 24' provided with suction holes 25 for shaping the blank work piece. The primary mold means 24 are movable in a direction perpendicularly to the plane of the drawing. First drive means 26, such as a reversible motor, drive the primary mold means 24 in a shuttling back and forth movement, for example, by means of a chain or pulley drive 27, rack members 28, and pinions 29. The shuttling movement of the primary mold means 24 is not limited to the just described drive means. For example, a conveyor comprising conveyors, such as shown at 17 and 18 in FIG. 3, could also be used for shuttling the first mold means 24 horizontally back and forth.

The upper machine frame 21' carries guide rods 30 for guiding the vertical up and down movement of second secondary mold means 31 driven by third drive means 32, such as a piston cylinder device. A support 33 carries the second secondary mold means 31 and is provided with slide bearings 34 which slide up and down the guide rods 30. The dimensions are such that the second secondary mold means 31 may be moved down sufficiently to enclose the primary mold body 24', for example, during a shaping or trimming operation to be described in more detail below. However, the shaping of the flat blank 2 may even be accomplished without the closing of the primary and second secondary mold means 31 by applying suction to the interior of the mold body 24', for example by means of a suction pump 35 operatively connected to the interior of the mold body 24' by a flexible hose 36. The hose 36 is of sufficient length to permit the horizontal back and forth shuttling movement of the primary mold means 24. The suction is effective through the holes 25 in the mold body 24', whereby the initially flat blank 2 assumes the shape of the mold body 24'.

The support 33 for the second secondary mold means 31 also carries the trimming tools 37, which are not shown in FIG. 3 for simplicity's sake, but which are shown in FIG. 4. These trimming tools carry, for example, strip steel knives 38 and are supported by brackets 39. Further details of such trimming tools are described in my above-mentioned U.S. Pat. No. 4,273,738. The strip steel knives 38 move relative to the support 33 and may even reach through the support 33 and the second secondary mold means 31 so as to be effective on the work piece held in position in the molding space 40 formed between the second secondary mold means 31 and a primary mold means 41. The primary mold means 41 differ from the primary mold means 24 shown in FIG. 3 in that an elastic bladder 42 is inserted inside the mold body of the mold means 41 for two purposes. The bladder 42 functions as a cooling means and also as a means for increasing the dimensional stability of the mold body 43. These two desirable functions are accomplished simultaneously by flowing a coolant under pressure through the elastic bladder 42. For example, water under pressure may enter into an inlet port 44 and leave through an exit port 45. The trimming tools 37 have their own drive means in the form of expandable hoses 46 which constitute fourth drive means for moving the trimming tools independently of the third drive means 32. The position of the support brackets 39 for the trimming tools 37 may be adjustable, as is described in more detail in my U.S. Pat. No. 4,273,738, whereby the knives 38 may extend substantially perpendicularly relative to a plane defined by the respective mold.

FIGS. 5, 6 and 7 will now be described in conjunction. These figures are to be viewed in a side-by-side relationship. Each of the FIGS. 5, 6, and 7 provides a view in the direction of the arrow A in FIG. 2. Thus, FIG. 5 illustrates the second auxiliary operating unit 10. FIG. 6 constitutes the main operating unit 1. FIG. 7 constitutes the first auxiliary operating unit 3.

Referring first to FIG. 5, the unit 10 comprises a machine frame 47 which supports third secondary mold means 48 forming a mold space 40 with the primary mold body 24' or with the primary mold body 43. The third secondary mold means 48 are movable up and down by fifth drive means 49, such as a piston cylinder. The piston rod is connected to a mold support 50, which carries the third secondary mold 48 through guide rods 51 to which the mold plate 52 is secured by guide bushings 53.

Reset springs 54 urge the mold plate 52 and the fourth mold 48 upwardly against expandable pressure application hose means 55. When the pressure is released from the expandable hose means 55, the springs 54 will return the mold means 48, 52 into the upper position ready for the next pressure application to the expandable hose means 55. The closing pressure applied through the hose means 55 may be in the order of, for example, twenty tons. The mold support 50 is guided by vertical guide rods 56. For this purpose, the mold support 50 is connected to the guide rod 56 by guide bushings or so-called ball boxes 57.

Figure 11:
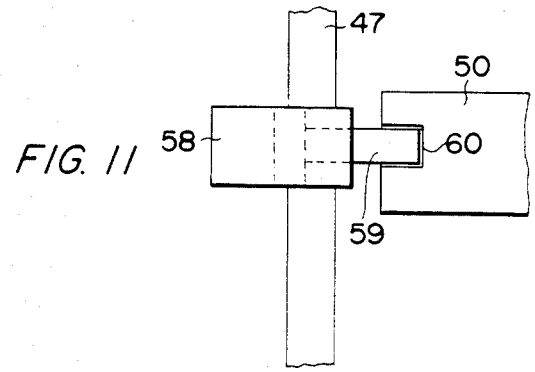
FIG. 11 is a side view of power operated locking means for rigidly locking a mold to the machine frame.

When the mold support 50 is moved downwardly into a mold closing position for cooperation with the primary mold means shown in FIG. 6, the mold support 50 will be rigidly locked to the frame structure 47 by locking means 58. FIG. 11 shows the locking means 58, for example in the form of a piston cylinder comprising a piston rod 59 which enters into a respective hole 60 in the mold support 50. Several locking means may be employed, two of which are shown in FIG. 5.

When the third secondary mold 48 is in the lowered position for cooperation with the mold means, the above mentioned molding or shaping space 40 is formed and a two-component foaming material may be introduced through a respective bore 61 which may cooperate with a spraying nozzle 62 for the two-component foaming material. The third secondary mold 48 is provided with a venting hole 63 for facilitating the foaming operation.

The primary mold means will be moved into a cooperating position relative to the third secondary mold means 48 by means of a conveyor 64, only the upper run of which is shown in FIG. 6, since the conveyor 64 as such is conventional.

Most of the elements shown in FIG. 6 have already been described with reference to FIGS. 3, 4 and 5. FIG. 6 also includes the locking means 58, 59 for the support 33 of the third mold means 31 whereby the second secondary mold means 31 may be rigidly locked to the machine frame 21'.

The primary mold means shown in FIGS. 6 and 7 differ from the primary mold means described with reference to FIG. 3 in that in FIGS. 6 and 7 the primary mold means 65 comprise two mold members 66 and 67. One mold member 66 is shown in FIG. 6.

The other mold member 67 is shown in FIG. 7. The one mold member 66 carries a mold body 24' of the same kind as shown in FIG. 3. The other mold member 67 carries a mold body 68 which may, for example, be of similar construction. The mold member 66 is supported on a carriage 69. The other mold member 67 is supported on a carriage 70. Each mold member 66 and 67 is rigidly connected to its carriage by removable means, such as threaded bolts 71. A rigid bar 72 interconnects the carriages 69 and 70 to keep the carriages properly spaced from each other. The bar 72 is provided with threaded ends 73 cooperating with threaded holes in the respective carriage 69, 70 for adjusting the exact spacing between the first mold members. Once the spacing is adjusted, the counter nuts 74 are tightened. Both carriages 69 and 70 are operatively connected to the top run of the conveyor 64, which is movable back and forth in the direction of the double arrow 8 or 9 so that the one mold member 66 may cooperate with the fourth mold 48 shown in FIG. 5 or with the third mold 31 shown in FIG. 6, and so that the other mold member 67 with its mold body 68 may cooperate with a first secondary mold means 75 or with the second secondary mold means 31.

Incidentally, the trimming tools 37 shown in FIG. 6 are provided with spring bias reset means 76 and with heating means 77 for the strip steel knives. Such heating means are, for example, described in more detail in my above mentioned U.S. Pat. No. 4,273,738.

Figure 8:
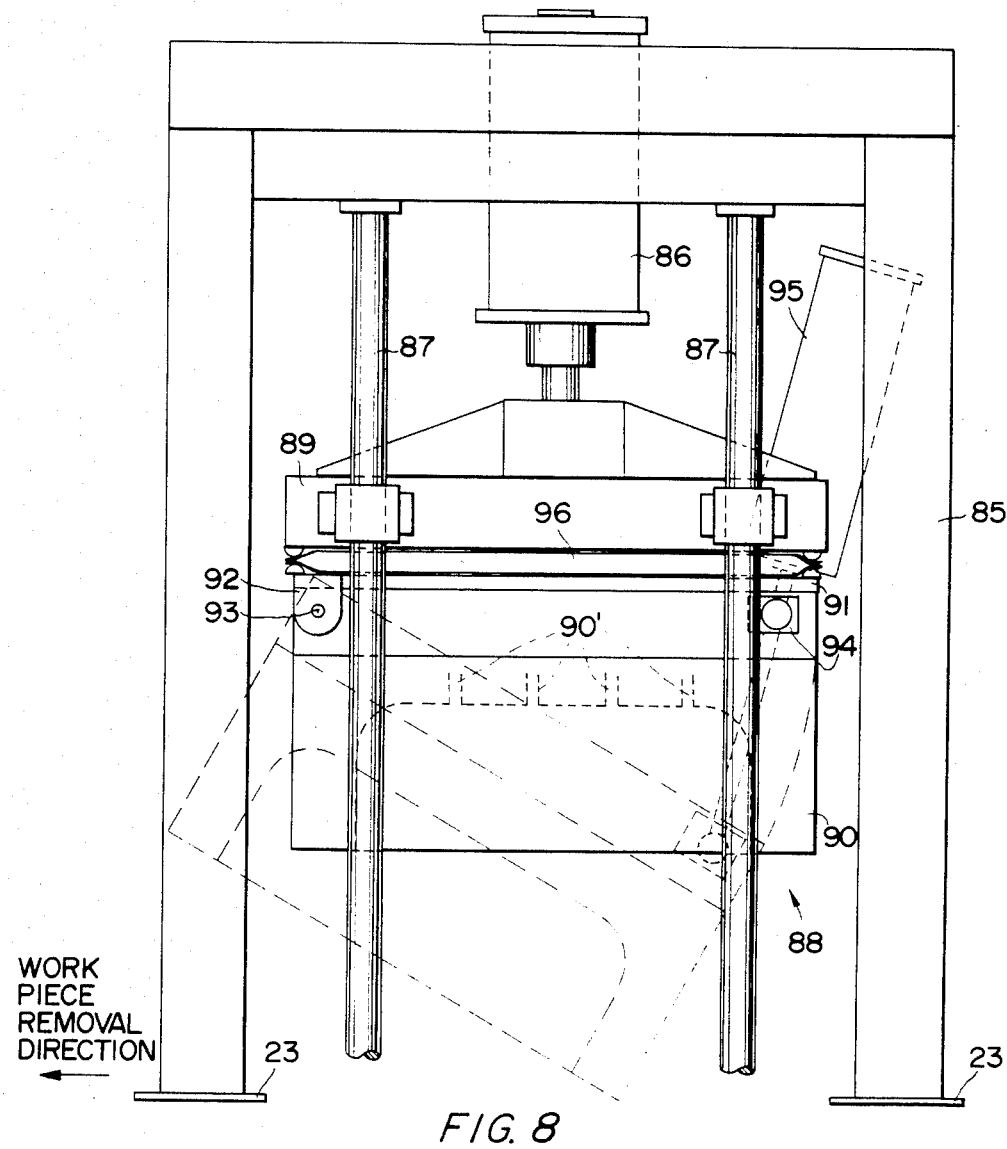
FIG. 8 is a side view of a modified secondary mold means.

FIG. 7 shows the first auxiliary operating unit 3, which supports the first secondary mold means 75 in a machine frame 78 which is also provided with the above mentioned locking means 58 cooperating with the support 79 of the first secondary mold means 75 which includes a female mold 80 cooperating with the mold body 68 to form a shaping or molding space 40 which may be filled with a foaming material through a conduit 81 and which is provided with venting means 82. The structure of the first secondary mold means 75 is basically the same as that described above with reference to the third secondary mold means shown in FIG. 5. Therefore, the first secondary mold means may be briefly described. A second drive means 83 moves the first secondary mold means 75 up and down. The mold closing force is also exerted by expandable hose means 84 as described, against reset spring means 84'. FIG. 8 illustrates a modification of a mold means whereby the view extends in the direction of the plane 3—3 in FIGS. 1 or 2. The purpose of this modification is to facilitate the treatment of a secondary mold means after the completion of a work cycle or for removing a finished work piece. In FIG. 8, the machine frame 85 supports the drive means 86 and guide rod 87 for the secondary mold means 88 comprising a support 89 which acts as a counter-force take-up-member as in all of the other molding means. The support 89 is connectable to the machine frame 85 by locking means 58, 59 not shown in FIG. 8. The mold 90 is connected to a mold plate 91 by hinges 92 which permit a tilting movement about the hinging axis 93. The mold 90 is shown in its molding position by full lines and in its down-tilted position by dashed lines. In the molding position, locking means 94 lock the mold 90 to the mold plate 91, which is movably secured to the support 89, for example by the same guide rod and guide bushing structure cooperating with reset springs as shown at 51, 53, and 54 in FIG. 5. When the locking means 94 are unlocked, a piston cylinder 95 may move the mold 90 from the full line position into the dashed line position and vice versa. When the locking means 94 are locked in the molding position of the mold 90, the mold closing pressure may be exerted by expandable hose means 96. The mold 90 may be equipped with suction holes 90' for removing and lifting a work piece from the primary mold means so that the work piece may be discharged with the aid of gravity after the mold has been tilted downwardly into the dashed line position and then shutting off the suction through the holes 90' or by replacing the suction through holes 90' by a sufficient expulsion pressure. In the tilted down position it is also easier to clean the secondary mold means after the work piece removal and to spray the secondary mold means with a coating, such as a wax coating, for avoiding the sticking of the work piece to the walls of the mold means.

Figure 9:
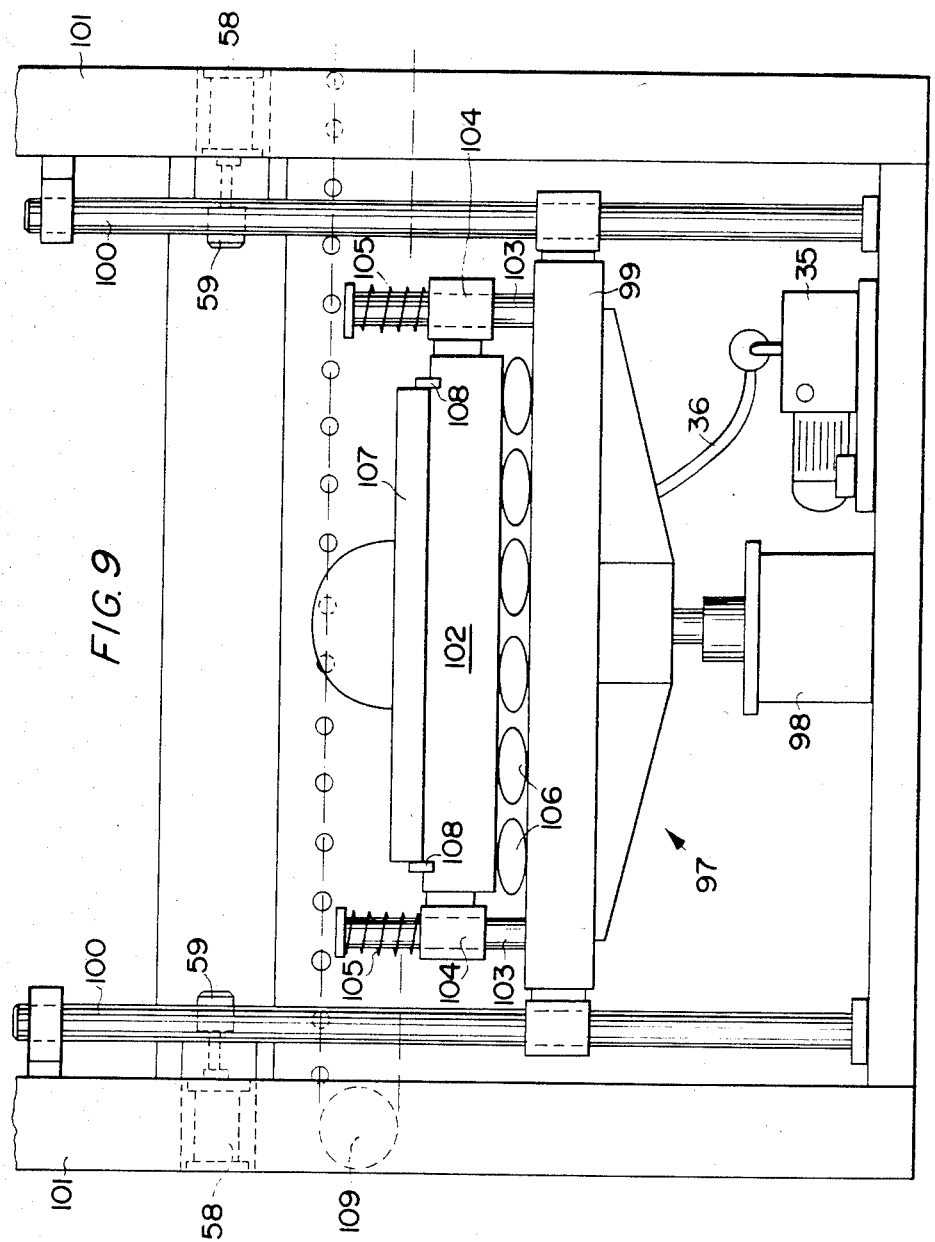
FIG. 9 is a front view similar to that of FIG. 6 but showing modified primary mold means.

FIG. 9 illustrates a modification of the primary molding means. The modification comprises molding means 97, which are vertically movable by piston cylinder means 98 carrying the mold support 99 which is guided in its up and down movement by vertical rods 100 held in the machine frame 101. The support 99 carries a mold plate 102 by means of guide rods 103 extending through guide bushings 104 cooperating with reset springs 105. The molding or mold closing pressure is exerted by expandable hose means 106 as described. The closing pressure may be substantial, for example in the order of twenty tons. In the raised, mold closing position, the mold support 99 may cooperate with the locking means 58, 59, also as described above.

In FIG. 9 the mold body 107 is removably secured to the mold plate 102 and a mold body centering structure 108 assures the proper positioning of the mold body 107 on the mold plate 102. The mold body 107 may thus be removed manually by the operator and placed on a conveyor 109 for a horizontal transportation of the mold body 107 into the adjacent station, not shown, for cooperation with the first secondary mold means as described above. The conveyor 109 may, for example, be of the same kind as shown at 17, 18 in FIG. 3.

In the embodiment of FIG. 9, the work piece, not shown, would also remain on the mold body 107 during all manufacturing steps. The initial shaping would also be accomplished by suction means 35, 36 operatively connected to the mold body 107.

Figure 10:
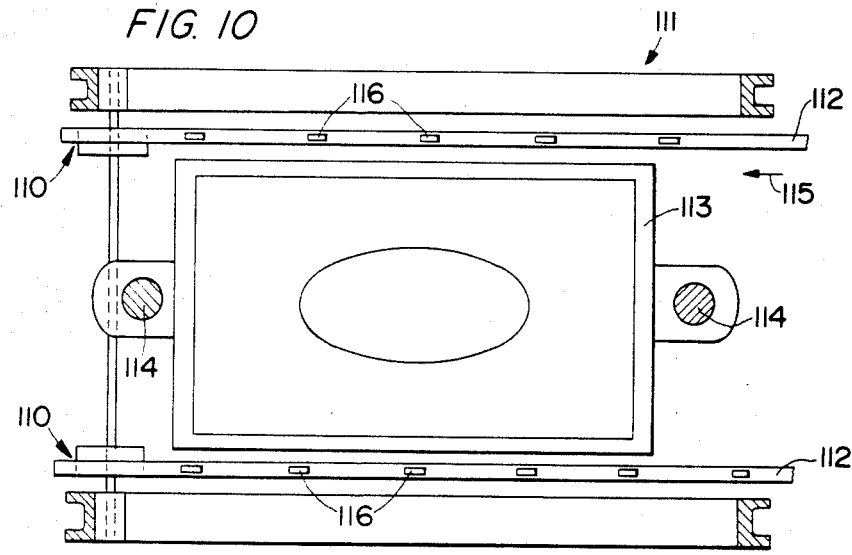
FIG. 10 is a top view onto the primary mold means of FIG. 6 whereby unimportant parts have been omitted.

FIG. 10 shows a modification of a conveyor system 110 for the supply of flat blanks of material into the main operating unit 111. In FIG. 3 it is necessary that the conveyor means 17 shuttles back and forth horizontally so that the left-hand end of the conveyor 17 is out of the way for the cooperation of the mold body 24' with the third mold means 31. Such a shuttling movement is not necessary for the conveyor means 110, because the conveying chains 112 are sufficiently spaced from each other, so that the mold body 113 may be moved vertically up and down guided by the guide rods 114 without interference with the conveyor chains 112. These conveyor chains 112 move continuously forward in the direction indicated by the arrow 115 and it is not necessary that the entire conveyor system is shuttled back and forth for moving the flat blanks of plastic material into position above the mold body 113. The chains 112 are equipped with clamping members 116 which hold the flat blank and which are manually opened by the operator in order to deposit the blank on the mold body 113.

A system such as shown in FIG. 1 would comprise the machines shown in FIGS. 5 and 6 whereby the primary mold means would comprise just a single mold. It is not important whether the auxiliary operating unit is arranged to the right of the main operating unit or to the left thereof. In both instances the system would perform the following steps. A preheated flat blank is removed from the conveyor 17 by the operator and placed on the mold body 24' of the primary mold means. The vacuum pump 35 is switched on whereby the blank is sucked against the shape of the primary mold body 24' to assume the shape thereof. The primary mold body carrying the shaped work piece now moves into the auxiliary station. The first secondary mold means are lowered and locked by the locking means 58, 59 into the mold closing position. The two components foaming material, such as polyurethane foam, is now introduced into the mold space 40. The molding pressure is now exerted by pressurizing the expandable hose means such as 55 or 84. The mold means remain closed until the two components foam has sufficiently cured to properly bond to the blank. The lock is opened and the first secondary mold means are lifted vertically. The primary mold means move back into the main operating unit and the second secondary mold means operating as counter-holder mold means 31 are lowered by the third drive means 32. The locking means are closed and the trimming tools 37 are operated, for example, by pressurizing the expandable hose means 46.

The second secondary mold means are then lifted and the work piece removed from the mold body 24' by cutting off the suction, for example through a valve in the conduit 36. The finished work piece is then removed from the mold body 24' by the operator or lifted off the mold body 24', as described above with reference to FIG. 8. It should be noted that the counter-holder or the second secondary mold means may be omitted if the vacuum holding of the work piece is sufficient to hold the work piece in position during the trimming operation. The use of counter-holder means will primarily depend on the type and size of the work piece. Moreover, the removal of the work piece 2 from the mold body 24' may be facilitated by temporarily introducing increased pressure into mold body 24'. This may also be accomplished through the holes 25 in FIG. 3.

The system shown in FIG. 2 and illustrated in more detail in the combination of FIGS. 5, 6, and 7 operates as follows. A preheated work piece 2 is placed on the mold body 24' forming one primary mold member and the vacuum is switched on. The carriage 69 moves to the left in the direction of the arrow 9 to bring the mold body 24' into cooperation with the third secondary molding means. The third secondary mold means are lowered by the fourth drive means 49 and the mold means are locked in the closed position. The foaming operation is performed and the primary and first secondary mold means remain closed until a sufficient curing has taken place. Meanwhile, a second work piece is placed on the mold body 68 forming the other primary mold member which is in the main machine shown in FIG. 6 while the body 24' is in the machine shown in FIG. 5. The third secondary mold means are then unlocked and opened and the two mold members of the primary mold means move to the right in the direction of the arrow 8. The first secondary mold means 75 are brought into the mold closing, locked position shown in FIG. 7, whereby the shaping may take place by pressure forming rather than by vacuum forming. The foaming is accomplished by introducing the two components foaming material through the conduit 81 into the mold space 14 and the foam is permitted to cure. Meanwhile, in the main operating unit, the second secondary mold means with the trimming tools have been lowered for the trimming of the first work piece while the second work piece is still curing in the machine of FIG. 7. During this curing time, the second secondary mold means with the trimming tools is lifted and the finished work piece is removed from the mold body 24' and the next preheated blank is placed on the mold body 24' of the primary mold means for a repetition of the described steps. As the mold body 24' moves to the left again, the mold body 68 also moves to the left simultaneously after the first secondary mold means have been unlocked and lifted. Now the trimming operation takes place in the main machine shown in FIG. 6 for the work piece on the mold body 68. The work piece is then removed from the mold body 68 and a new blank is introduced. Thus, the two carriages 69 and 70 move in unison to the left and right and left again in a continuous repetition of the described work steps.

Although the invention has been described with reference to specific example embodiments, it will be appreciated, that it is intended to cover all modifications and equivalents within the scope of the appended claims.

What is claimed is:

1. An apparatus for manufacturing a three-dimensional work piece, comprising a first station including primary mold means for holding an initially flat blank work piece, means movably supporting said primary mold means in said first station, first drive means operatively connected to said primary mold means for reciprocating said primary mold means in a given direction, said primary mold means shaping said flat blank work piece of plastics material into a molded blank work piece which assumes the form of the primary mold means, a second station arranged next to said first station, said first drive means moving said primary mold means back and forth between said first and second stations, said second station comprising first secondary mold means (75) movably mounted for cooperation with said primary mold means which still hold the molded blank work piece, second drive means operatively connected to said first secondary mold means for moving the first secondary mold means relative to said primary mold means, second secondary mold means movably supported in said first station, third drive means operatively connected to said second secondary mold means for moving the second secondary mold means in said first station relative to said primary mold means still holding the molded blank forming said three-dimensional work piece, trimming tool means operatively supported by said first or second secondary mold means for trimming the three-dimensional work piece while it is still held by said primary mold means, and fourth drive means operatively connected to said trimming tool means for moving the trimming tool means relative to a three-dimensional plane defined by at least one of said mold means, whereby a work piece remains on said primary mold means during all operational steps of the apparatus.

2. The apparatus of claim 1, wherein said primary mold means comprise first and second primary mold members (67, 66) connected to each other, said apparatus further comprising a third station arranged for cooperation with said first station, third secondary mold means movably supported in said third station and fifth drive means for moving said third secondary mold means relative to said primary mold means, whereby said first primary mold member 67 may cooperate with the first and second secondary mold means, while said second primary mold member 66 may cooperate with the second and third secondary mold means.

3. The apparatus of claim 1, further comprising flat blank supply and heating means operatively arranged to feed heated blanks to said primary mold means substantially in a direction extending perpendicularly to said given direction of reciprocation of said primary mold means.

4. The apparatus of claim 1, further comprising a vacuum source, means operatively connecting said vacuum source to said primary mold means, and apertures in said primary mold means for sucking said flat blank against the shape of said primary mold means for performing said shaping of said work piece in said primary mold means.

5. The apparatus of claim 1, wherein said first or second secondary mold means cooperate with said primary mold means for said shaping of said work piece.

6. The apparatus of claim 2, wherein said first or second or third secondary mold means cooperate with said primary mold means for said shaping of said work piece.

7. The apparatus of claim 1, wherein said stations comprise frame means and releasable locking means secured to said frame means for rigidly locking any one of said primary and secondary mold means to said frame means for directly introducing any shaping or mold closing pressure into said frame means.

8. The apparatus of claim 1, further comprising expandable hose power application means operatively connected to said first and second secondary mold means for exerting a mold closing force on said mold means.

9. The apparatus of claim 1, further comprising machine frame means for each of said stations, horizontal first guide means secured in said machine frame means for guiding a horizontal reciprocating movement of said primary mold means, and vertical second guide means secured in said machine frame means for guiding a vertical reciprocating movement of the respective secondary mold means.

10. The apparatus of claim 2, wherein said first, second, or third secondary mold means comprise backing means and molding means, hinging means tiltably securing the respective molding means to its backing means, operating means connected to said molding means for tilting the molding means between a closed molding position and an open work piece removing position, and locking means for locking said molding means to its backing means in the closed molding position.

11. The apparatus of claim 2, further comprising flat blank supply and heating means operatively arranged to feed heated blanks to said primary mold means substantially in a direction extending perpendicularly to said given direction of reciprocation of said primary mold means.

12. The apparatus of claim 2, wherein said shaping means comprise a vacuum source, means operatively connecting said vacuum source to said primary mold means, and apertures in said primary mold means for sucking said flat blank against the shape of said primary mold means.

13. The apparatus of claim 2, wherein said stations comprise frame means and releasable locking means secured to said frame means for rigidly locking said mold means to said frame means for directly introducing any shaping or mold closing pressure into said frame means.

14. The apparatus of claim 2, further comprising expandable hose power application means operatively connected to said mold means for exerting a mold closing force on said mold means.

15. The apparatus of claim 2, further comprising machine frame means for each of said stations, horizontal first guide means secured in said machine frame means for guiding a horizontal reciprocating movement of said primary mold means, and vertical second guide means secured in said machine frame means for guiding a vertical reciprocating movement of the respective secondary mold means.

16. The apparatus of claim 2, wherein said first, second, or third secondary mold means comprise backing means and molding means, hinging means tiltably securing the respective molding means to its backing means, operating means connected to said molding means for tilting the molding means between a closed molding position and an open work piece removing position, and locking means for locking said molding means to its backing means in the closed molding position.

17. The apparatus of claim 1, wherein said holding means are counter-holder means.

18. The apparatus of claim 2, wherein said holding means are counter-holder means.

19. The apparatus of claim 1, further comprising conveyor means for repeatedly moving flat blank work pieces into said first station, said conveyor means comprising an upper conveyor (17) and a lower conveyor (18) arranged below said upper conveyor (17), engagement members (21) operatively connecting said upper conveyor (17) to said lower conveyor (18), drive means (19) operatively connected to said lower conveyor (18) for driving said lower conveyor so that its upper run moves alternately to the right and left, whereby said engagement members move said upper conveyor so as to project alternately beyond one or the other end of said lower conveyor, said upper conveyor (17) moving in a direction from a supply of flat blank work pieces toward said first station.

20. The apparatus of claim 19, further comprising sheet supply means (11, 12) located above one end of said upper conveyor for depositing flat blank work pieces on said upper conveyor, when said upper conveyor projects below said sheet supply means.

* * * * *